Aug. 5, 1969       J. P. BANNER       3,458,981
WEEDING TOOL

Filed Sept. 30, 1966       2 Sheets-Sheet 1

INVENTOR.
JOSEPH P. BANNER
BY
Gregory J. Nelson
ATTORNEY.

Aug. 5, 1969    J. P. BANNER    3,458,981
WEEDING TOOL

Filed Sept. 30, 1966    2 Sheets-Sheet 2

INVENTOR.
JOSEPH P. BANNER
BY
*Gregory J. Nelson*
ATTORNEY.

United States Patent Office 3,458,981
Patented Aug. 5, 1969

3,458,981
WEEDING TOOL
Joseph P. Banner, 2550 N. Venice Place,
Tucson, Ariz. 85716
Filed Sept. 30, 1966, Ser. No. 583,229
Int. Cl. A01d *55/00;* A01b *1/00*
U.S. Cl. 56—229                4 Claims

ABSTRACT OF THE DISCLOSURE

A manual weeding tool of the scraper type having a frame of a number of parallel spaced apart elements aligned in the direction of use and supporting a handle and a cutting blade at the front edge mounted perpendicular to the frame elements. The frame is supported on wheels and is formed in an angular configuration to provide a controlled cutting action as it is used. As the tool is moved into growth, weeds are severed and gathered on the frame while dirt and the like fall through the frame openings.

---

My invention relates to a manually operated tool for severing weeds, shrubs, and unwanted vegetation and, more particularly, to a bladed tool of the scraper type.

It is an object of my invention to provide a device for easy and effective severance of unwanted plant growth with a minimum disturbance to the soil.

It is another object of my invention to provide a device that is a combination weeding, raking, and leveling tool.

It is another object of my invention to provide a device that will weed closely to adjacent obstructions as well as under shrubs and bushes.

Another object of my invention is to provide a weeding tool in which the depth and angle of soil penetration is easily controllable by the user.

A specific object of my invention is to provide a weeding tool that separates loosened dirt and soil from the severed growth during use.

A specific object of my invention is to provide a weeding device that is easily operable by the user from a comfortable upright position by movement over the ground.

Other objects, advantages, features will become apparent upon reading the following specification, drawings, and claims, which form a part of my disclosure.

Weeds and other troublesome, undesired growth are usually removed by hand or by chopping out with a hoe or shovel or other similar devices. Removal by hand is a laborious and difficult task. Hoeing or shoveling, although effective, are undesirable for several reasons. First of all, the removal process is slow as only a small area of ground can be covered with each stroke. Further, the ground is tilled or loosened by this type of action which softens the ground actually making it easier for other weeds to grow. Loosening of the soil, causing soft spots, is particularly undesirable in gravel driveways or areas covered with gravel for decorative appearance. These conventional methods also require the caretaker, after weed removal, to have a separate rake available for leveling the ground and picking up the severed growth.

Other types of weeding devices are commercially available. These have certain disadvantages in that they cover little area or provide little or no control of the cutting depth and angle. Other prior art devices do not provide for weed removal next to walks, curbs, and other obstructions. Neither do these known devices separate loosened dirt from the severed vegetation.

My novel weeding tool avoids all of the foregoing disadvantages as it is easy to use, it does not unnecessarily loosen the soil, it works from an easy rhythmic, planing motion, and it avoids the necessity for the user to have, in addition, a rake to pile the severed growth and level the ground.

Referring to the drawings, wherein an embodiment of the invention reduced to practice is shown and like reference numbers refer to similar elements:

The weeding tool of my invention comprises a frame generally indicated as 1 having slots or apertures therein to which is attached a handle 2 for manually operating the tool. Wheels 20 are affixed to the frame for easy movement of the device over the ground. A cutting bar or blade, shown as 7, is attached to the leading edge of the frame by insertion into the blade holder or receptacle. The blade acts to pull out and sever the weeds or growth as the tool is pushed along the ground being cleared with a back and forth motion.

Figure 1:
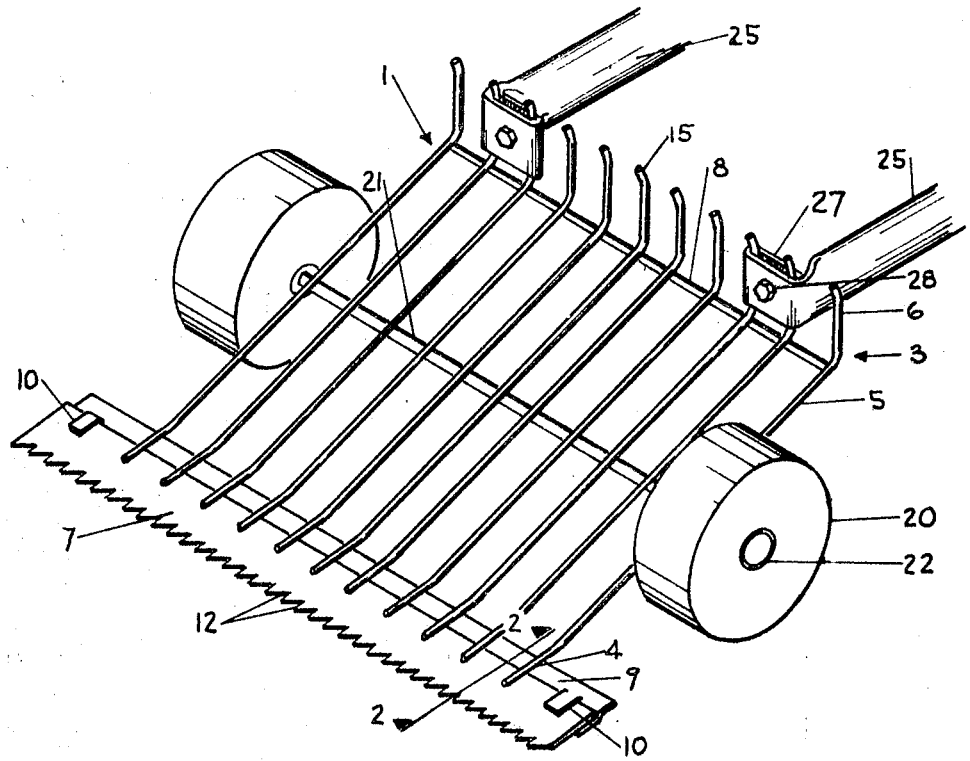
FIGURE 1 is a perspective view showing in detail my weeding tool.
Figure 3:
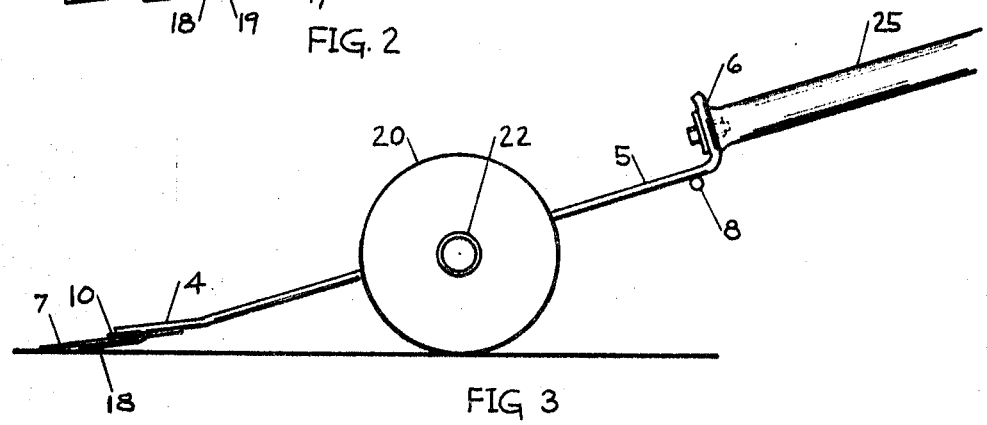
FIGURE 3 is a side elevational detail view of my invention.

In FIG. 1, more particularly, the frame 1 having apertures therein is constructed of a number of generally parallel bars 3. These bars may be of any suitable structural shape, such as metal rods, and made rigid by welding. These bars are bent, as shown more clearly in FIG. 3, having a lower section 4, an intermediate section 5, and an upper section 6. The lower section 4 and the intermediate section 5 are joined so that an obtuse angle is formed between them. The upper section 6 joints the upper ends of section 5 and is bent at generally right angles with respect to the intermediate section 5 and has its terminal end 15 bent slightly forward, as shown. This forward bend 15 acts to hold the handle more firmly in place as described more fully hereafter.

At the upper end of the frame, perpendicular to the bars 3, and attached near the joint between sections 5 and 6 is a tie rod 8. This tie rod is shown on the underside of the frame but may also be located on the upper side and acts to give the frame rigidity and alignment.

At the lower end of the frame 1, a cutting bar receptacle or holder 9 is mounted so that it is affixed on the lower side of section 4. This holder is perpendicular to the frame elements and extends horizontally beyond the outermost dimensions of the wheels 20. The leading edge of the holder is formed having flanges 10 spaced in a short distance from either end. These flanges act to secure the blade near its end. Intermediate the flanges the blade is held in place by a slot as hereinafter described. The placement of the flanges inwardly from the edge of the holder gives more strength and the flanges are not as easily broken when the tool is in use.

Figure 2:
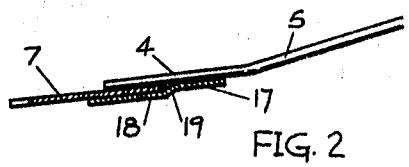
FIGURE 2 is a sectional view taken along section line 2—2 of FIG. 1 showing the cutting blade and the blade holder in detail.

FIG. 2, taken along section line 2—2 of FIG. 1 shows the blade holder in more detail. The holder has a general S shape with two horizontal legs 17 and 18 joined at the middle by a short vertical section 19. The end of the lower leg 18 of the blade holder terminates approximately at the end of the lower portion 4 of the frame bars. The upper leg 17 is rigidly attached to frame section 4 in a manner whereby a slot is formed between the underside of the section 4 and the upper side of the leg 18. The cutting blade 7 is inserted into this slot.

This means of holding the blade makes it easy to change blades as the old blade can be easily slipped out without the loosening of screws or bolts. Further the blade is held securely in place during use as the forward movement of the tool forces the blade backward and firmly in the slot.

The blade is made of a high quality steel and is shown as having a saw tooth type of cutting edge 12. For some types of uses a knife edge blade may be preferable. In fact, it would be possible for the blade to be reversible having a knife edge on one side and a saw blade on the other. The blade could then easily be removed, reversed, and reinserted in the slot. This relatively wide blade affords the advantage of covering a relatively wide area with each scraping motion.

Wheels 20 are mounted on either end of axle 21 which extends perpendicular to frame sections 5 approximately at their midpoint. The wheels are of any suitable material such as hard rubber and are held on the axle 21 by a slip ring 22. The placement of the wheels is important for several reasons. The axle of the wheels act as a fulcrum around which the entire device pivots. By simply raising the handle, the tool is placed in a controlled cutting or scraping position of any desired depth. Lowering the handle raises the blade to a higher cutting or scraping position, frees the blade of the ground. In a normal position of use with the end of the handle at approximately the user's waist, the blade intersects the ground at an effective cutting angle.

Figure 4:
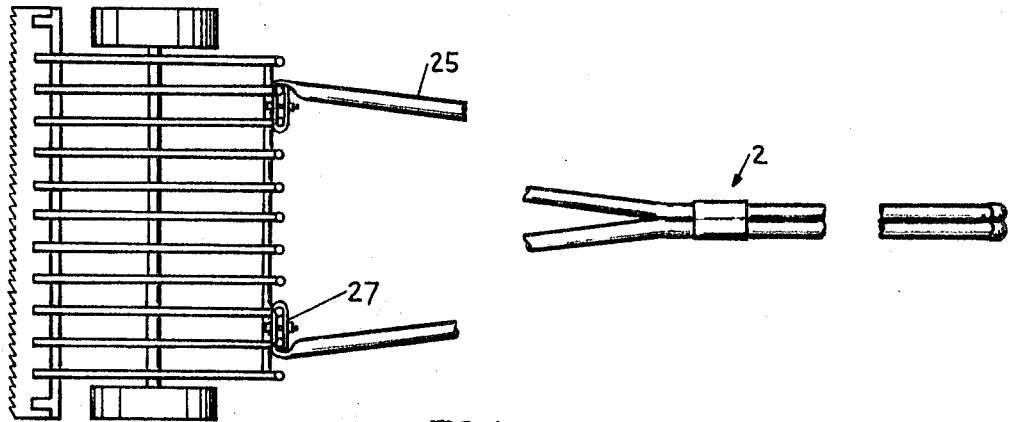
FIGURE 4 is a plan view with the handle partly broken away.
Figure 5:
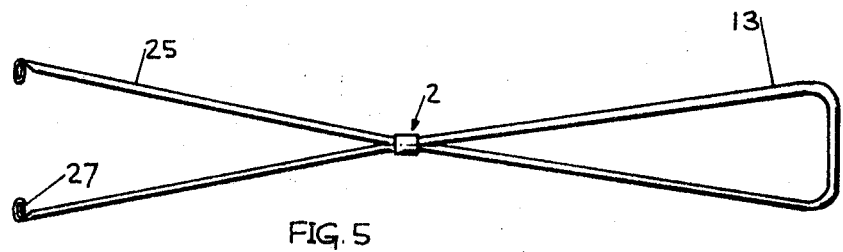
FIGURE 5 shows an alternate handle for my device which may be preferable to some users.

The handle 2 is made of metal pipe or tubing and is best seen in FIGS. 4 and 5; has two forked members 25 which attach to the frame 1. The handle is readily attached to frame section 6 by flattening the end portion 27 of the tubular handle and bending the flat end in a general U around the ends of several of the perpendicular pieces 6. Since the upper ends 15 of section 6 are bent forward, the handle after extensive rugged use will not slip free. A bolt 28, and associated nut and lock washer extend through a drilled hole in the flattened end of the handle and between the section 6 to hold the handle firmly to the frame. It will be obvious that other methods of joining, such as welding or riveting could be used.

The handle as shown in FIG. 4, has a general Y shape with the grip end turned down for convenient holding. An alternate handle, which may be preferred in many cases is shown in FIG. 5. The handle here has the same forked end but is formed at the holding end 13 in a oval to accommodate being held by both hands of the user.

Figure 6:
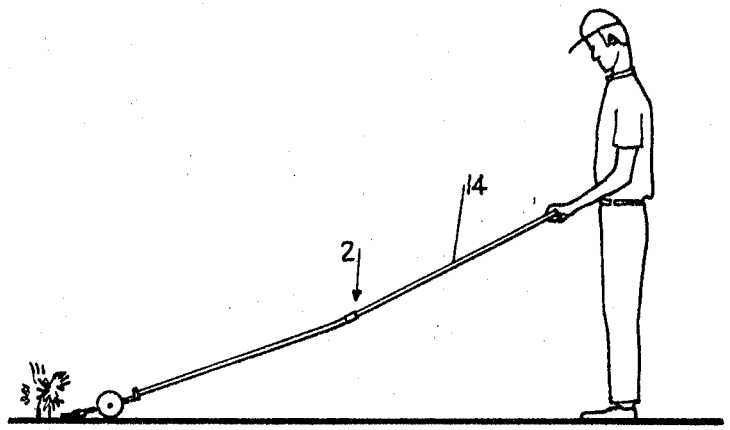
FIGURE 6 illustrates my weeding tool as it appears in operation.

In side elevation, as clearly seen in FIG. 6, the handle is formed having a slight V shape. This is to make use of my device easy and effective for by rotating the handle only a short distance the blade is made to rotate about the axle and will be put into a cutting position. Also, as mentioned, when the handle is in an ordinary position of use, the blade will be in an effective position for severing vegetation.

In use, my weeding device works as follows: referring to FIG. 6, the user grasps the device by the handle and raises the handle to about approximately his waist. The tool pivots about the axle and the cutting blade intersects the ground at an acute angle. The user simply pushes the device continuously or back and forth over the ground to pull out and severs weeds and other vegetation. If it is desired to dig deeper the handle is raised slightly causing the device to rotate about axle increasing the angle of the blade to the ground.

As the device moves into the growth, the weeds are severed or pulled out slightly below ground level and they fall back and are gathered on frame 1. Dirt, rocks, and other foreign matter fall through the frame leaving the severed growth. When a substantial amount of growth has been severed and collected on the frame, the device is turned over and the ground leveled using the blade as a rake. The removed weeds can easily be raked into a pile.

Also, it will be seen that since the blade extends horizontally beyond the wheels, it is possible to remove growth immediately next to curbs and other obstructions. Because of the design and shape, my device enables the user to sever growth under trees and other not easily accessible areas.

It will be apparent to those skilled in the art that various changes may be made in the details of construction described herein.

I claim:

1. A weeding device manually operable by pushing back and forth over the ground comprising:
    (a) a rigid frame being formed of a number of generally parallel spaced apart members, each of said frame members being constructed of a lower member and an upper member joined together to form an obtuse angle on their upper sides;
    (b) blade holding means mounted on the bottom side of the lower frame member and perpendicular thereto whereby a slot is between the lower frame member and the blade holding means for removably securing a blade;
    (c) blade means inserted in said slot;
    (d) a handle attached to the upper end of said frame, said handle being shaped so that when held approximately at the user's waist the cutting edge of said blade means will be presented to the ground; and
    (e) wheel means rotatably mounted on said frame whereby the frame can pivot about said wheel means to provide a controlled cutting action.

2. The device of claim 1 wherein the blade and blade holding means extend horizontally at both of their ends to a point corresponding at least to the outermost horizontal extension of the wheels.

3. The device of claim 2 wherein flanges are provided on the blade holder provide to secure the blade near its horizontal outermost extremities.

4. A weeding device of the scraper type that is manually traversed over the ground comprising:
    (a) a rigid frame formed of a number spaced apart members parallel to the line of traverse of the device, each of said frame members being continuous and bent to form a lower section, an intermediate section, and an upper section, said lower and intermediate sections forming an obtuse angle on their upper sides and said intermediate and upper section forming a generally right angle;
    (b) blade holding means affixed to the bottom side of the lower frame section being perpendicular thereto whereby a slot for removably securing a blade is formed between said lower frame member and said blade holding means;
    (c) a handle attached to the upper section of the frame;
    (d) an axle affixed to the intermediate frame section transversally thereof and extending laterally beyond the frame;

(e) wheels mounted on the lateral extensions of said axle; and
(f) blade means removably inserted in said slot, said blade means terminating at either end at a point beyond the outermost extremity of the wheels.

References Cited
UNITED STATES PATENTS

| | | | |
|---|---|---|---|
| 112,130 | 2/1871 | Davenport | 172—766 X |
| 407,928 | 7/1889 | Hallock | 171—83 X |
| 1,094,437 | 4/1914 | Harris | 172—766 |
| 1,137,594 | 4/1915 | Erwin | 171—136 X |
| 1,828,129 | 10/1931 | Critz | 56—229 |
| 3,190,361 | 6/1965 | Lemanski | 171—83 |

ANTONIO F. GUIDA, Primary Examiner

PASQUALE A. RAZZANO, Assistant Examiner

U.S. Cl. X.R.

171—83, 136; 172—378, 766